United States Patent
Sadagopan et al.

(10) Patent No.: US 9,773,077 B2
(45) Date of Patent: Sep. 26, 2017

(54) SYSTEM AND METHOD FOR PREDICTION OF SNAP-THROUGH BUCKLING OF FORMED STEEL SHEET PANELS

(75) Inventors: Sriram Sadagopan, Darien, IL (US); Oscar Lanzi, Chicago, IL (US)

(73) Assignee: ArcelorMittal Investigacion y Desarrollo, S.L. (ES)

( * ) Notice: Subject to any disclaimer, the term of this patent is extended or adjusted under 35 U.S.C. 154(b) by 751 days.

(21) Appl. No.: 13/442,166

(22) Filed: Apr. 9, 2012

(65) Prior Publication Data

US 2013/0268215 A1    Oct. 10, 2013

(51) Int. Cl.
*G06F 17/50* (2006.01)

(52) U.S. Cl.
CPC ...... *G06F 17/5018* (2013.01); *G06F 2217/16* (2013.01); *G06F 2217/42* (2013.01)

(58) Field of Classification Search
CPC ............ G06F 17/5018; G06F 2217/42; G06F 2217/16
USPC .......................................................... 702/42
See application file for complete search history.

(56) References Cited

U.S. PATENT DOCUMENTS

| | | | |
|---|---|---|---|
| 3,186,753 A | 6/1965 | Steffanoff | |
| 5,278,953 A | 1/1994 | Saxon et al. | |
| 5,546,314 A | 8/1996 | Brost et al. | |
| 5,696,687 A | 12/1997 | DeMotte et al. | |
| 6,953,240 B2 * | 10/2005 | Cabal | B41J 2/14 347/54 |
| 7,158,922 B2 * | 1/2007 | Sadagopan et al. | 703/2 |
| 2003/0063425 A1 | 4/2003 | Smith et al. | |
| 2003/0205565 A1 * | 11/2003 | Nelson | B29C 66/836 219/148 |
| 2003/0222871 A1 | 12/2003 | Brombolich | |
| 2004/0172224 A1 * | 9/2004 | Sadagopan | G06F 17/5018 703/2 |

OTHER PUBLICATIONS

R. Wiebe, On Snap-Through Buckling , Apr. 2011, American Institute of Aeronautics and Astronautics., pp. 1-9.*

(Continued)

*Primary Examiner* — Matthew Luu
*Assistant Examiner* — Patrick King
(74) *Attorney, Agent, or Firm* — Faegre Baker Daniels LLP

(57) ABSTRACT

A simplified tool is provided for simultaneous prediction of dent resistance and snap-through buckling resistance of roof panels including the effect of roof bow placement, curvatures of the roof panel, thickness of the roof, and steel grade. In one embodiment, a method of predicting snap-through buckling resistance of a sheet metal panel to an applied load under localized loading conditions is provided, wherein the sheet panel has certain defined geometries. The method includes the steps of: identifying first and second principal radii of curvature of the panel; identifying a thickness of the panel; identifying the distance of a portion of the panel between structural supports; creating a mathematical function to determine load deflection behavior for snap-through buckling; and determining the likelihood of the panel to display snap-through buckling characteristics under various localized applied loads by inputting the parameters.

15 Claims, 11 Drawing Sheets

(56) References Cited

OTHER PUBLICATIONS

Wiebe et al., "On Snap-Through Buckling," 52nd AIA/ASME/ASCE/AHS/ASC structures, Structural Dynamics and Materials, 19th Apr. 4-7, 2011, Denver, Colorado, p. 1-9.*

"On Snap-Trhough Buckling," Weibe et al., 52nd AIAA/ASCHE/AHS/ASC Structures, Strructural Dynamics and Materials Conference (Apr. 4-7, 2007).*

Singha et al, Nonlinear Response of Laminated Cylindrical Shell Panels Subjected to Termomechanical Loads, Journal of Engineering Mechanics, vol. 132, No. 10, Oct. 1, 2006.

Kundu et al, Post Buckling Analysis of Smart Laminated Doubly Curved Shells, Composite Structures 81, 2007, pp. 314-322.

Nagai et al, Experiments and Analysis on Chaotic Vibrations of a Shallow Cylindrical Shell-Panel, Journal of Sound and Vibration 305, 2007, pp. 492-520.

Teng et al, Geometrically and Materially Nonlinear Analysis of Reinforced Concrete Shells of Revolution, Computers & Structure, Vo. 42, No. 3, 1992, pp. 327-340.

* cited by examiner

SYSTEM AND METHOD FOR PREDICTION OF SNAP-THROUGH BUCKLING OF FORMED STEEL SHEET PANELS

BACKGROUND OF THE INVENTION

This invention relates to a system and method for simultaneous prediction of dent resistance and oil canning resistance of automotive roof panels, and in particular, to how the effect of roof bow placement, curvatures of the panel roof, thickness of the roof, and steel grade affect dent and oil canning resistance.

Among the performance problems that can occur in an automobile panel, and in particular, a roof panel, are oil canning, also known as snap-through buckling, and dents. Snap-through buckling is an inherent part of light gauge formed metal products, in particular, those with broad flat areas such as an automobile roof panel. Obviously, snap-through buckling and dents can mar the appearance of a panel, produce unwanted noise, and may reduce consumer satisfaction level.

Snap-through buckling is a complicated instability phenomenon that occurs in relatively flat panels and is experienced by a number of industries which deal with large and shallow panels. Fundamentally, snap-through buckling is caused because of compressive stresses placed upon a circular arch. These compressive stresses may be caused by external loading or by residual stresses resulting from manufacturing. The result of this instability is dependent upon the type of loading, curvature of the panel, compliance with the supporting structure, as well as other variables. The problem with snap-through buckling on shallow arches has been studied previously in some detail. Although useful to explain the phenomenon of snap-through buckling, the boundary and loading conditions used in prior studies are not simulative of the in-service loading conditions experienced in the automotive industry. Accordingly, the results could not be used to evaluate snap-through buckling resistance of automotive panels.

Resistance to denting and snap-through buckling are important properties for closure panels. Dent resistance of automotive closure panels has been studied extensively and is known to be dependent on the steel grade, thickness, and panel curvature. In many cases, the ability of a higher strength steel grade to achieve weight reduction by reducing the thickness is limited by the stiffness of the panel and its resistance to snap-through buckling. Snap-through buckling is a phenomenon that occurs on loading of a panel, when the panel resistance suddenly decreases with increasing imposed deflection. In some instances, the drop-in load is accompanied by the release of a sound.

Historically, dent resistance and snap-through buckling resistance were evaluated by physical testing of panels according to Auto/Steel Partnership guidelines. Physical testing of a number of prototype parts would give the best indication of expected dent resistance and snap-through buckling resistance during service, but it requires significant time and effort. In addition, different types of steel to be prototyped need to be identified and procured from a steel mill for the testing. Stamping and assembly trials also require coordination in the middle of existing production runs, and then, finally, prototype parts could actually be tested. Over the last decade, Finite Element Analysis (FEA) has been used extensively for evaluation of these performance metrics. The analysis methodologies and pass/fail bogeys vary with the manufacturer and also depend on the panel type and vehicle class. Typically, a full vehicle structural model is truncated to obtain the exposed panel structural model. The model is then further refined at the localized areas of loading and submitted for analysis and the results post-processed. Using this typical approach, analysts might take a few weeks to arrive at an appropriate solution to determine a thickness-grade combination for a given exposed panel.

Meeting requirements for snap-through buckling resistance, stiffness and dent resistance are important drivers for most automotive Original Equipment Manufacturers (OEMs) in making material decisions for exposed panels. As discussed, dent resistance has been shown to be dependent on panel curvature, steel grade, thickness and stretch imparted to the panel door during the stamping process. The bake hardening of steel grades has been one method of increasing the panel strength to decrease the weight of outer panels while meeting the dent resistant performance, and increasing the panel strength from the paint bake cycle has been used effectively.

The owner of the present patent application has previously developed a model for prediction of dent resistance for a number of steel grades. The model has been shown to be reasonably accurate in comparison with physical test results; however, before now the model has been applicable only to doors. The system and method is described in U.S. Pat. No. 7,158,922 B2 to Sadagopan et al., which is incorporated herein in its entirety by reference.

Snap-through buckling is characterized by a drop in resistance of the panel in response to an imposed deflection under localized loading conditions. As the thickness of the sheet metal decreases, resistance to snap-through buckling also decreases, and in some cases, the drop in resistance is accompanied by a significant noise. Unlike dent resistance, resistance to snap-through buckling is dependent on the panel geometry, support conditions and thickness. The steel grade is relatively unimportant to snap-through buckling. In many instances, the ability to down gauge a panel is limited by its snap-through buckling resistance.

Accordingly, an object of the present invention is to provide predictive guidelines for snap-through buckling resistance of roof panels. Another object of the present invention is to expand the on-line dent resistance model previously developed for door panels. Utilization of such tools enables optimization and selection of radii of curvature, steel grade, thickness, and design decisions during the styling stage of vehicle development to meet stiffness, snap-through buckling and dent resistance criteria for panels. An advantage of the subject invention is to allow an OEM to avoid spending significant analysis time while minimizing the need for costly fixes, adjustments, and changes later on in program development. A further object of the invention is to provide reasonable results for idealized geometries and loading conditions to analyze possible scenarios in relation to the steel grade, steel thickness, panel styling, and design options that can be performed in a much shorter time frame than conventional analysis techniques will allow.

A further object of the invention is to provide predictive models of snap-through buckling and dent resistance for automotive roof panels where the models can be combined in a single-user interface. Another object of the invention is that the predictive model correlate favorably with FEA when the loading is located in the center of the panel. The predictive model shows that resistance to snap-through buckling of roof panels can be influenced by placement of appropriate roof bows, and that snap-through buckling can be avoided by placing roof bows closer to one another.

SUMMARY OF THE INVENTION

A simplified tool is provided for simultaneous prediction of dent resistance and snap-through buckling resistance of roof panels including the effect of roof bow placement, curvatures of the roof panel, thickness of the roof, and steel grade. In one embodiment, a method of predicting snap-through buckling resistance of a sheet metal panel to an applied load under localized loading conditions is provided, wherein the sheet panel has certain defined geometries. The method includes the steps of: identifying a first principal radius of curvature of the sheet metal panel; identifying a second principal radius of curvature of the sheet metal panel; identifying a thickness of the sheet metal panel; identifying the distance of a portion of the sheet metal panel between structural supports; creating a mathematical function to determine load deflection behavior under a standardized loading (said behavior henceforth being called "load deflection behavior") with respect to snap-through buckling; and determining the likelihood of the sheet metal panel to display snap-through buckling characteristics under various localized applied loads by inputting the parameters of the two principal radius of curvature, the thickness of the panel, and the distance of a portion of a sheet panel between structural supports in combination with the mathematical function.

The first principal radius of curvature may be a front view radius of curvature of the sheet metal panel and the second principal radius of curvature may be a side view radius of curvature of the sheet metal panel. The sheet metal panel may be a roof panel and the distance can be the length between roof bows supporting the roof panel.

BRIEF DESCRIPTION OF THE DRAWINGS

The above-mentioned and other features and objects of this invention and the manner of obtaining them will become more apparent, and the invention itself will be better understood by reference to the following description of embodiments of the present invention taken in conjunction with the accompanying drawings, wherein.

Figure 1:
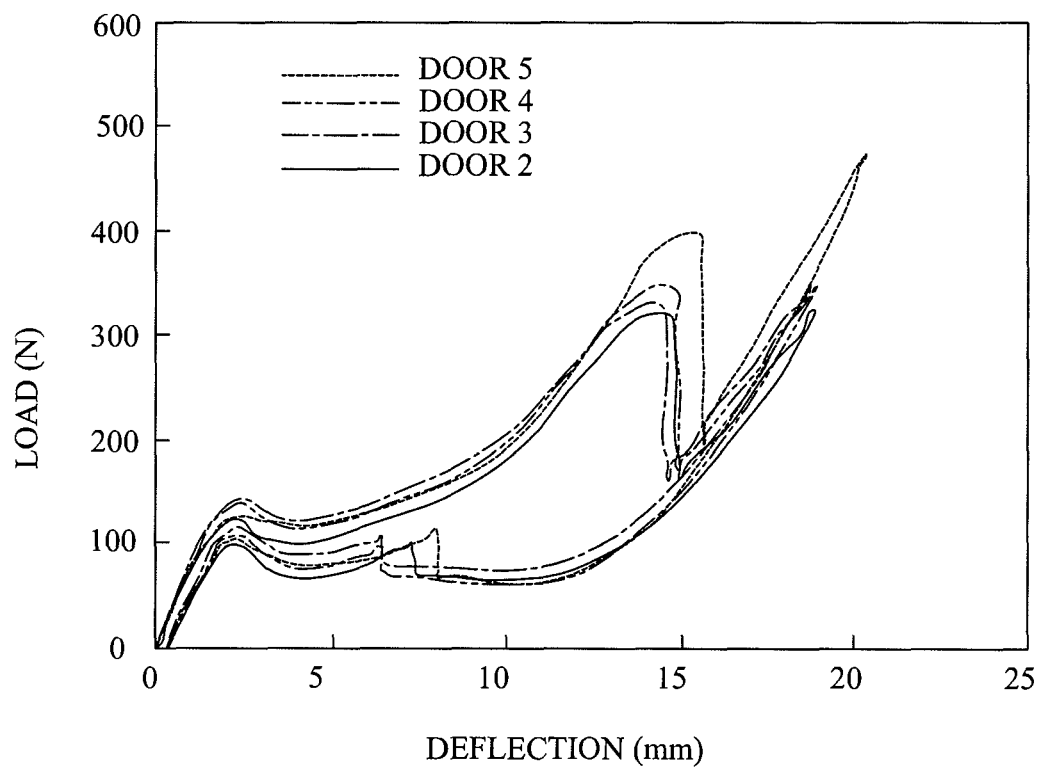
FIG. 1 is a graph depicting the deflection of a door panel in relation to applied load.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purpose of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

The embodiment disclosed below is not intended to be exhaustive or limit the invention to the precise form disclosed in the following detailed description. Rather, the embodiment is chosen and described so that others skilled in the art may utilize its teachings.

The detailed descriptions that follow are presented in part in terms of algorithms and symbolic representations of operations on signals within a computer memory representing alphanumeric characters or other information. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, symbols, characters, display data, terms, numbers, or the like. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart a physical organization on the information stored in memory. More than mere abstraction, the data structures are specific electrical or magnetic structural elements in memory which simultaneously represent complex data accurately and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein that form part of the present invention; the operations are machine operations. Useful machines for performing the operations of the present invention include general-purpose digital computers or other similar devices. In all cases the distinction between the method operations in operating a computer and the method of computation itself should be recognized. The present invention relates to a method and apparatus for operating a computer in processing electrical or other (e.g., mechanical, chemical) physical signals to generate other desired physical signals and results.

The present invention also relates to an apparatus for performing these operations. This apparatus may be specifically constructed for the required purposes or it may comprise a general-purpose computer as selectively activated or reconfigured by a computer program stored in the computer. The algorithm presented herein is not inherently related to any particular computer or other apparatus. In particular, various general-purpose machines may be used with programs written in accordance with the teachings herein, or it may prove more convenient to construct more specialized apparatus to perform the required method steps. The required structure for a variety of these machines will appear from the description below.

One object of development was to provide numerical values of snap-through buckling load for idealized panel geometries as a function of principal radii of curvature and material thickness. FIG. 1 shows the load deflection behavior of a door panel tested using a flat indenter. The figure shows two instances of a drop in load with increased deflection, both of which correspond to snap-through buckling. In the first instance of snap-through buckling which occurs at a load of 100-140 N, no sound was heard, whereas in the second instance at 300-400 N, a large sound was heard. At the instance of snap-through buckling, there is a sharp decrease in the load.

Another aspect of the development was to determine the effect of roof bows on prediction of snap-through buckling load and load deflection to provide a curve similar to testing results shown in FIG. 1 and to develop predictive models for roofs similar to the dent resistance model developed for door panels. FEA was used primarily in lieu of conduction of physical experiments.

Figure 2:
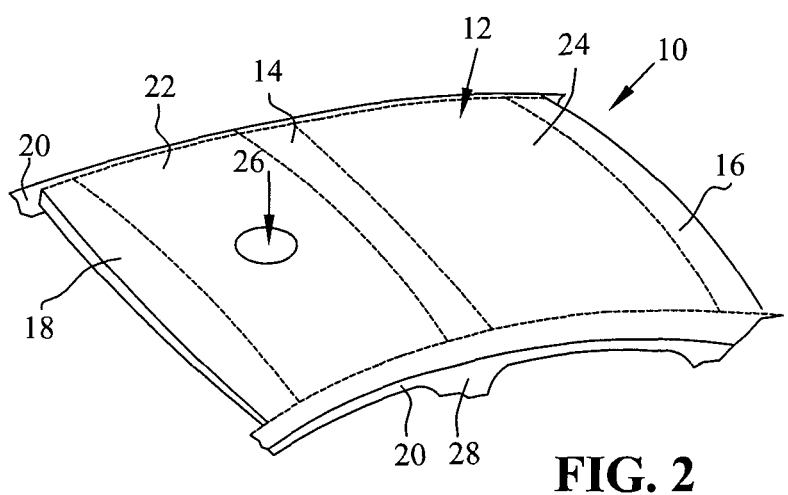
FIG. 2 is a roof panel showing the loading location for snap-through buckling analysis.
Figure 4:
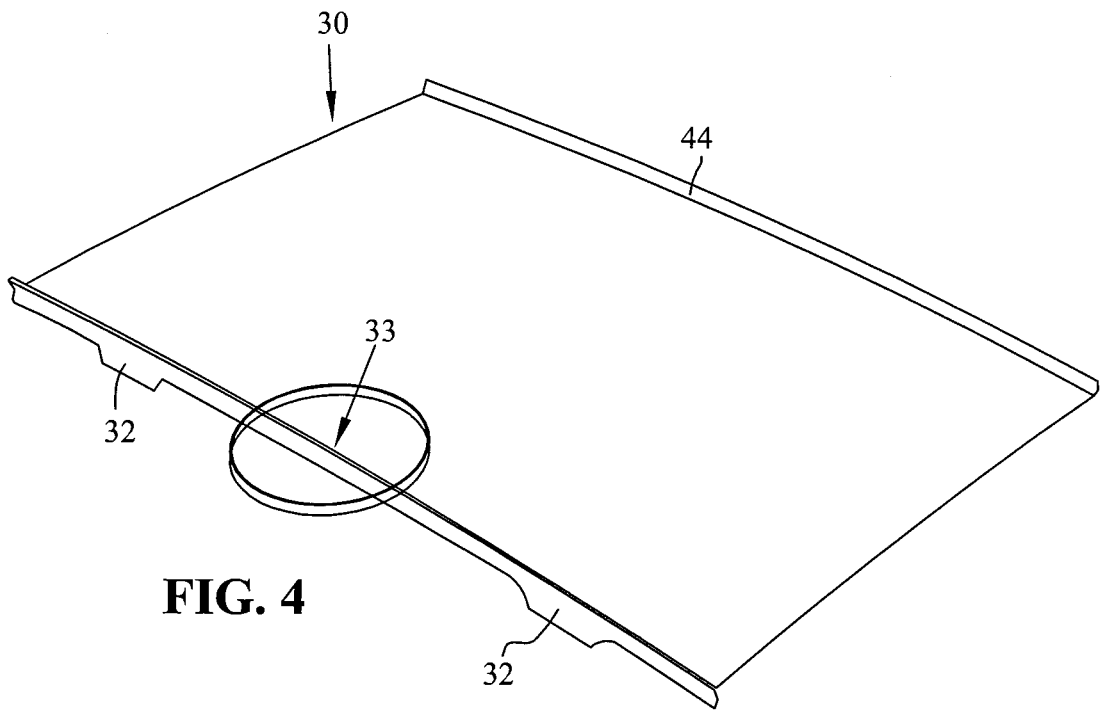
FIG. 4 is a representative area of the panel model of the roof showing boundary conditions used in the analysis.
Figure 5A:
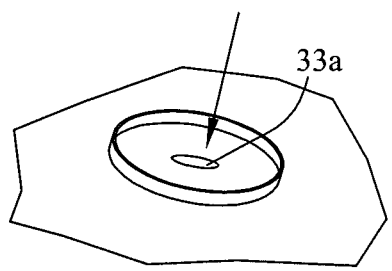
FIG. 5A shows an indenter used in snap-through buckling analysis.

Now referring to FIG. 2, a representative FEA model of a roof structure is shown, generally indicated as 10. Roof structure 10 includes a panel, generally indicated as 12, a roof bow 14, a header 16, a windshield header 18, and roof rails 20. As can be seen, the roof structure provides two spans of unsupported roof panel 12 including a front roof panel portion 22 and a rear panel portion 24. A load 26 is shown being applied to front panel portion 22 for snap-through buckling analysis. Roof panel 12 is spot welded to the windshield header, rear header and roof rails. For a typical four-passenger sedan, roof bow 14 spans the width between roof rails 20 at the location of pillars 28. Roof bow 14 is spot welded to roof rails 20 and is also attached to roof panel 12 with mastic, which hardens during the paint based cycle. An indenter, as shown in FIGS. 3, 4, and 5A, is used for applying the load at 26. In the example shown, the indenter and load are placed at the center of unsupported front panel portion 22 of roof panel 12 between windshield header 18 and roof bow 14. To develop predictive models, it was necessary to define a Representative Area of the Panel (RAP), which would closely approximate the geometry of the roof and boundary conditions while still allowing for parametric studies. The RAP in FIG. 2 is represented by the broken-line outline of front panel portion 22.

Figure 3A:
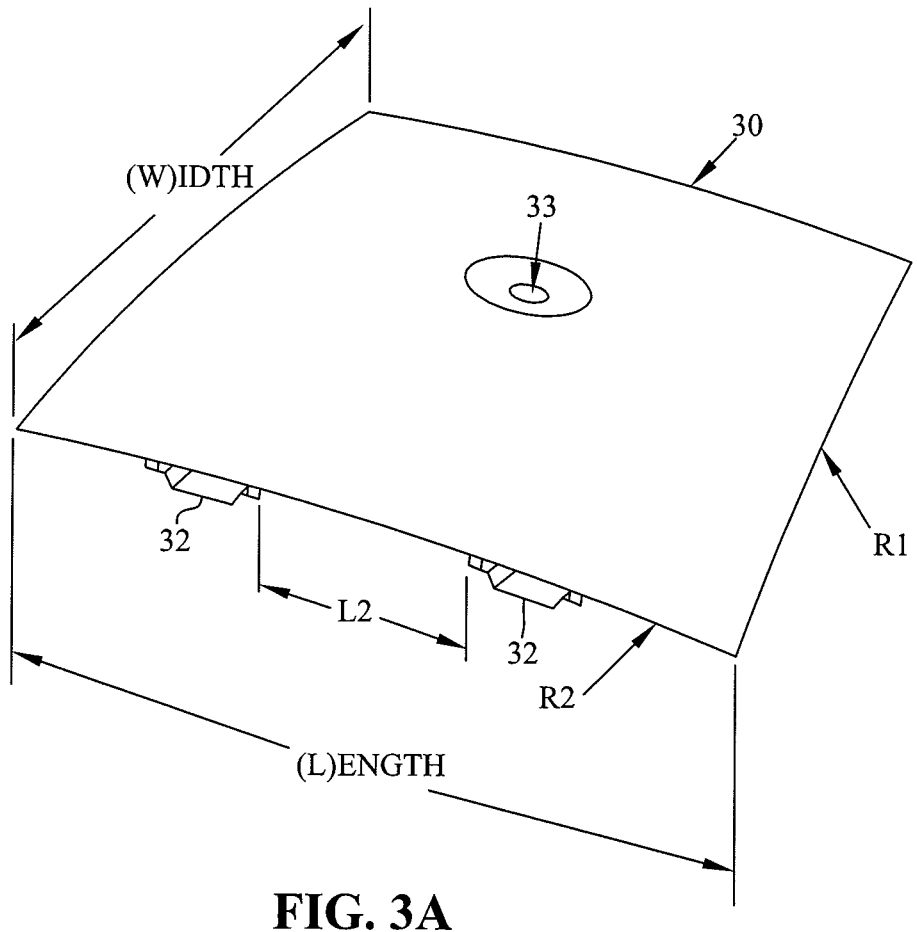
FIG. 3A is a representative area of the panel of the roof structure showing geometrical features that were variables in a predictive model.
Figure 3B:
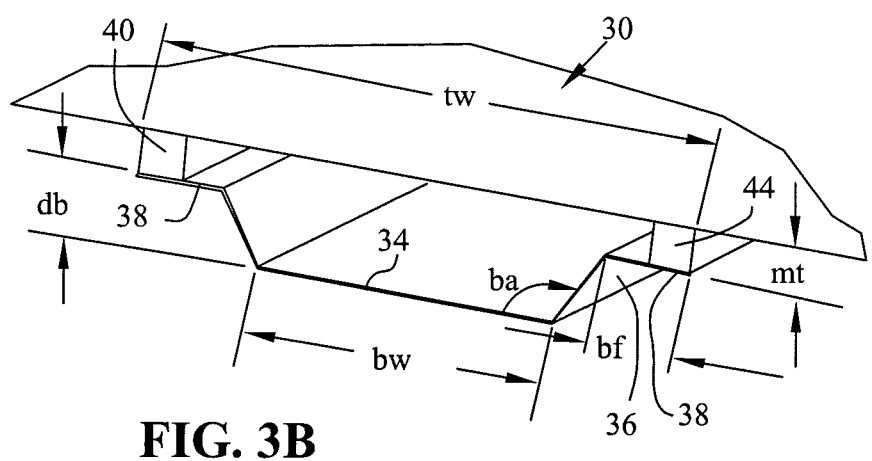
FIG. 3B is a close up showing details of a roof bow.

Now referring to FIG. 3A, a RAP of a roof panel is shown, generally indicated as 30. The width of RAP is designated as W and length as L. Two representative roof bows 32 are shown supporting the RAP. A load applied with an indenter is generally indicated at 33. For purposes of the present example, the roof bow geometry was not varied. Variables included the front view radius of curvature R1, the side view radius of curvature, R2, and unsupported length between roof bows L2. Bow 32 includes a bottom portion 34, two angled legs 36, and flanges 38 extending from angled legs 36. Referring to FIG. 3B, details of the roof bow 14 include the top width of the bow tw, bottom width of the bow bw, depth of the bow db, and flange length of the bow bf. The angle between bottom portion 34 and angled legs 36 is designated as ba. Mastic 40 is located between flanges 38 of bow 32 and RAP 30. The thickness of mastic 40 is designated as mt. The dimensions of the bow were held fixed in regard to the first example.

Each individual FEA model was created based upon these fixed variables and given values associated with R1, R2, and L2. The values of R1, R2, and L2 were based upon a Design of Experiments (DOE) matrix, which is described further below.

Figure 5B:
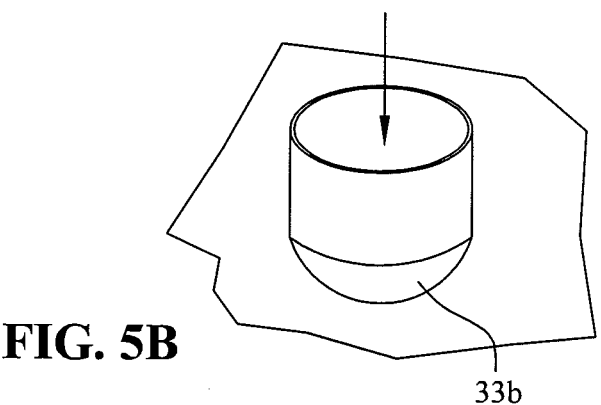
FIG. 5B shows an indenter used in dent resistance analysis.

Now referring to FIGS. 4 and 5A, 5B, boundary conditions in FEA models and indenters for two different load cases are shown. In FIG. 4, RAP 30 is pinned or supported at 44. In FIG. 5A, a flat indenter 33a was used for snap-through buckling analysis while a hemispherical indenter 33b (FIG. 5B) having a diameter of 25.4 mm was used for dent analysis. For dent resistance, use of a 25.4 mm indenter has been accepted as a "standard" in North American automotive and supplier industries; however, for snap-through buckling resistance, indenters can vary significantly across panels, vehicle classes and manufacturers.

Figure 6:
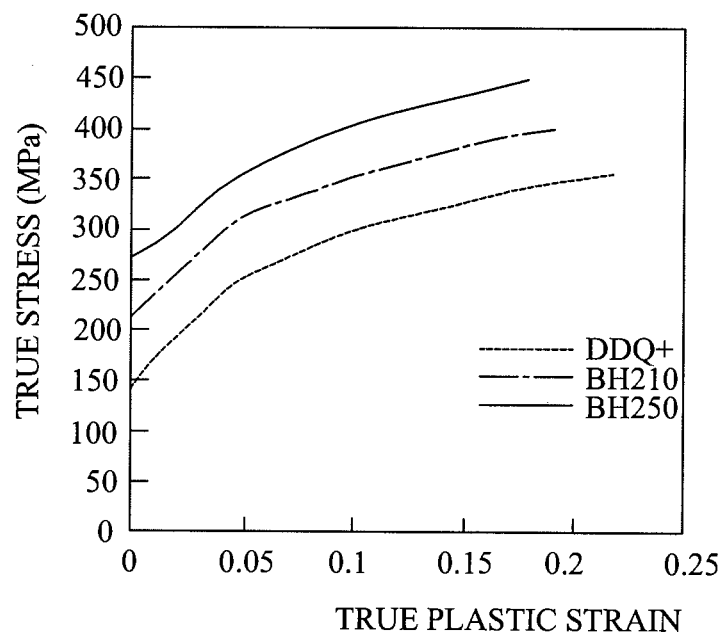
FIG. 6 is a graph of true stress versus true plastic strain for materials used in the analysis.

Now referring to FIG. 6, a chart of the true stress versus plastic strain data is shown for three grades of steel, namely, DDQ Plus, BH210, and BH250 which were the materials considered for RAP 30. The roof bows were modeled as drawing quality steel.

For the DOE, four variables were analyzed including the front view radius of curvature R1, the side view radius of curvature R2, the unsupported length between roof bows L2, and thickness (t) of the roof panel for determining resistance to oil canning. For dent resistance, the variables included the front view radius of curvature R1, and the side view radius of curvature R2 again as well as a material thickness; however, the effective strain $\bar{\epsilon}$ was used instead of the unsupported length between roof bows. Some screening simulations examining the effect of the length between roof bows L2 on dent resistance showed no dependence on that factor so it was not included in the DOE for denting. For the front and side view radii of curvature, the center values of the variables were chosen such that the values of the curvatures (1/R1, 1/R2) are equally spaced. More levels were chosen for the unsupported length between roof bows L2 because of the complicated dependence of oil canning behavior on that factor.

The DOE for snap-through buckling and denting was a fully orthogonal L27 design (henceforth referred to as "L27"), iterated over a fourth variable. To illustrate, the DOE for snap-through buckling was L27, with the front and side view radii of curvature and thickness being the variables. This DOE was iterated over length between roof bows L2 resulting in 243 individual simulations. For denting, L27 was based on the front and side view radii of curvature and effective strain as the variables iterated over three values of thickness resulting in an L81 design. For denting, this design was adopted for convenience of FEA model description.

Two measures of snap-through buckling resistance were determined to be the performance attributes, namely, load deflection behavior and snap-through buckling load.

Three scenarios of load to deflection behavior must be considered in the model. These are "hard" oil canning (FIG. 7A) corresponding to a true snap-through buckling wherein actual load decreases with additional deflection over some range of deflections, "soft" oil canning (FIG. 7B) wherein incremental resistance decreases but a decrease in actual load does not occur, and no oil canning (FIG. 7C). The load deflection curves are considered to be composed of two component curves; a stable response curve and a collapsed or buckled response curve. Each of these curves is fitted by using regression analysis to identify specific points on the curve followed by interpolation using piece wise or quadratic or cubic polynomials between the fitted points.

In all cases the fitting is not done directly to experimental curves. Rather it is done to FEA-generated curves, whose creation is described above. This choice is made for two reasons. First, independent testing has shown that the FEA results agree with the experimental ones where such a comparison is possible. Secondly it is not feasible within a reasonable time to conduct controlled experiments for such a large number of cases.

As discussed above, three scenarios of oil canning must be considered in the model; namely, "hard" oil canning, "soft" oil canning, and no oil canning as defined above. The definition of stable and collapsed responses, and the transition point between them, must be developed in terms of each of these three scenarios.

Figure 7A:
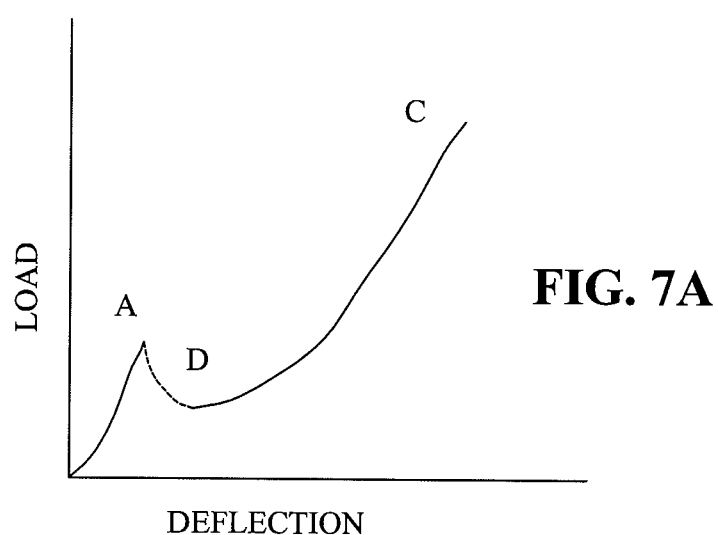
FIG. 7A is a graph depicting deflection in relation to applied load for hard oil canning.

In hard oil canning as shown in FIG. 7A, there is a reversal in the observed load-deflection curve. The buckling and unbuckling processes are connected with the fact that in the initial part of the collapsed curve, from A to D, the resistance to deformation becomes negative—the curve slopes downward instead of upward—and this represents an inherently unstable situation.

Figure 7B:
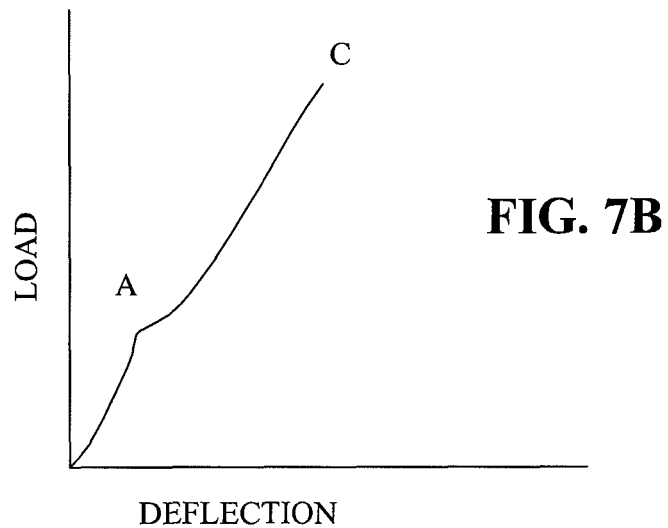
FIG. 7B is a graph depicting deflection in relation to applied load for soft oil canning.
Figure 7C:
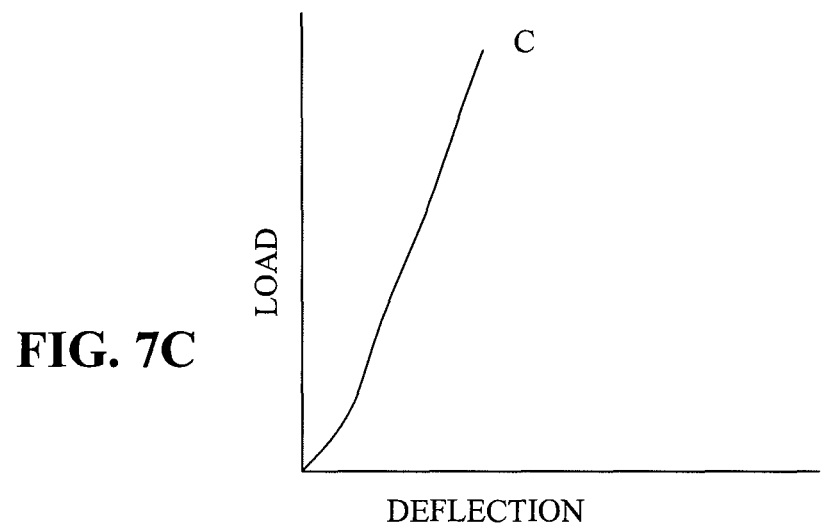
FIG. 7C is a graph depicting deflection in relation to applied load with no oil canning.

In soft oil canning as shown in FIG. 7B, there is a decrease in resistance to deformation at A. However, here the resistance to deformation is positive everywhere and so buckling is avoided. Only the points A and C remain identifiable. The stable response runs from zero to A and the collapsed response takes over from there.

Finally in FIG. 7C, there is no reduction in resistance to deformation at any point; this is called "no oil canning." The stable response applies continuously throughout the load-deflection curve. However, for the purpose of mathematical modeling it is still necessary to identify a transition point and a collapsed curve. The model is so structured that for the case of no oil canning the "collapsed" curve merges smoothly with the stable one so as to leave only one smooth curve.

The collapsed response is fitted first because the output from that fit impacts the fitting of the stable response and the transition point between them.

To fit a generic curve, one fits several defined points on the curve and then interpolates between the fitted values. The interpolation method chosen here is Hermite spline interpolation, and it requires both values and derivatives at each defined point. For the collapsed response the defined points are taken to be the transition point and the loads at 2, 3, 4, 5, 6, 7, 8, and 9 mm. The fit to the fixed deflection points (2 through 9 mm) is described first. Results from that fit are then used to fit the value and slope at the transition point.

For the deflections at 2 through 9 mm the load, as determined form the FEA calculations, is fitted according to the formulation:

$$\ln(y) = \Sigma_{j+k+l+m \leq 2} A_{jklm} t^j R_1^{-k} R_2^{-l} L_2^{-m} \quad [1]$$

Here y is the load in N, $A_{jklm}$ is a coefficient which is evaluated independently at each deflection, t is the thickness in mm, $R_1$ and $R_2$ are the front and side view radii in mm, and $L_2$ is the distance between the roof bows also in mm. The integers j, k, l, and m are nonnegative whole numbers adding up to no more than 2. Thus constant, linear and quadratic terms are included in the regression. In the case of the radii and the distance between the roof bows, the exponents are seen to have negative signs. This is because the quantities used in the regressions are not actually the values of these quantities but their multiplicative inverses. This gives the finite limiting values we expect for flat panels and long distances between supports. The logarithms are then exponentiated to give the fitted load values. Using the logarithmic function was found by trial and error to give the most consistent percentage errors in load predictions, especially in the low-load portions of the curve for hard oil canning.

The slopes are similarly fitted according to the formulation:

$$\frac{dy}{(ydx)} = \sum_{j+k+l+m \leq 2} B_{jklm} t^j R_1^{-k} R_2^{-l} L_2^{-m} \quad [2]$$

The left side of this equation is the derivative of the logarithm that was used in the fitting of load values. The right side has a new set of coefficients $B_{jklm}$, independent of the A coefficients and each other. The coordinate x represents the deflection. The fitted functions are then multiplied by the corresponding load values to obtain the derivatives d(y)/dx.

The regression methodology breaks down for the 10-mm displacement because the FEA data at that displacement are too sparse. Thus to obtain the load and its derivative at 10 mm, the values of ln(y) and dy/(y dx) are simply linearly extrapolated from their values at 8 and 9 mm. This leads to the resulting expressions:

$$y_{10} = \frac{y_9^2}{y_8}; \left(\frac{dy}{dx}\right)_{10} = y_{10} \cdot \left(2\left(\frac{dy}{(ydx)}\right)_9 - \left(\frac{dy}{(ydx)}\right)_8\right), \quad [3], [4]$$

Here the subscripts 8, 9, 10 refer to the values of the displacement in mm. The right hand sides of the equations come from the fitted values for ln(y) and dy/y dx applied at 8 and 9 mm form the regressions [1] and [2] for those two displacements.

With the loads and derivatives determined at the points from 2 through 9 mm, cubic Hermite interpolation is used to fit them. For each interval, the cubic polynomial requires four coefficients to be determined. This is accomplished by matching both the fitted the load values and the fitted slopes at the two ends of the interval.

For the transition point the load and deflection must both be fitted by regression. The load is fitted to a regression containing some cubic terms along with the quadratic ones:

$$\ln(y_t) = \Sigma_{j+k+l+m \leq 3, j \leq 2, k \leq 2, l \leq 2} C_{jklm} t^j R_1^{-k} R_2^{-l} L_2^{-m} \quad [5]$$

Here the subscript t on y indicates the load is evaluated at the transition point. The subscript on the summation sign indicates that the exponents j, k, and l are still limited to a maximum of 2, while the exponent m is allowed to take a value as large as 3 provided that the sum of all exponents is less than or equal to 3. Thus the cubic terms are those that contain at least one factor of ($L_2^{-1}$). The deflection is fitted to a regression analogous to Eq. [1]:

$$x_t = \Sigma_{j+k+l+m \leq 2} D_{jklm} t^j R_1^{-k} R_2^{-l} L_2^{-m} \quad [6]$$

The deflection x is subscripted with t to indicate the transition point.

Figure 7D:
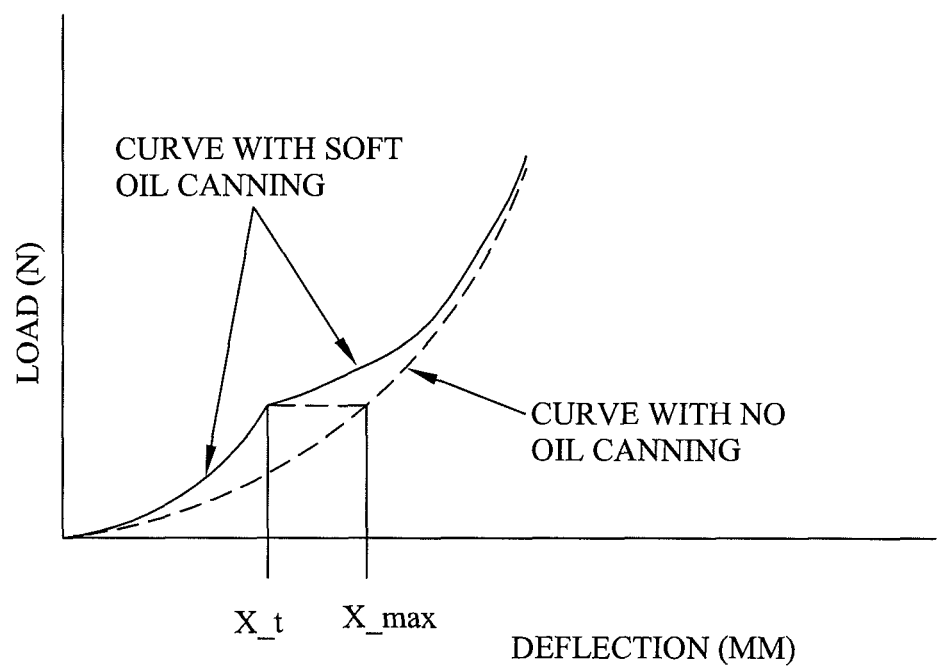
FIG. 7D is a graph depicting deflection in relation to applied load for both soft oil canning and no oil canning.

This assumes that a hard or soft oil canning occurs. As shown in FIG. 7D, this corresponds to a decrease in the derivative as x increases beyond the transition point, which in turn requires the deflection to have less than a certain maximum value indicated in FIG. 2 as $x_{max}$. the value of $x_{max}$ is computed from the fitted load value and derivative at 2 mm displacement, and the initial slope of the stable response curve (see next section), assuming a quadratic interpolation of the stable response from zero to the transition point. The result of this calculation is given by:

$$x_{max} = (\sqrt{(s_0-s_2+y_2)^2 + 4y_t(s_2-s_0)} - (s_0-s_2+y_2))/(s_2-s_0) \quad [7]$$

In this equation the values of $y_2$ and $s_2$ represent the fitted load and slope at 2 mm, and $s_0$ is the slope of the stable response at zero load and deflection (to be determined below). When the regression value given in Eq. [6] exceeds the maximum given in Eq. [7], the latter is used in place of the former. In all cases studied the transition point occurs with less than 2 mm displacement.

With the transition load and deflection fitted, a quadratic interpolation is used instead of a cubic one between the transition point and 2 mm displacement. The lower degree polynomial avoids ill-conditioning that may occur when the displacement at the transition point is close to 2 mm. The interpolation is again required to match the load values at both ends of the interval (the transition point and the 2 mm displacement point), but the slope is matched only to the fitted value at 2 mm displacement. The quadratic interpolation curve automatically gives the slope of the collapsed curve at the transition point and thus determines whether hard oil canning (indicated by a negative slope of the collapsed response at the transition point) occurs.

The stable response is assumed to be simply a quadratic curve from zero up to the transition point. Since the curve must pass through the origin and the value of the load is fixed at the transition point by Eq. [5], only one free parameter remains to be determined and this is taken to be the slope of the curve at the origin. This is determined by a regression equation analogous to Eq. [1] or [6]:

$$s_0 = \Sigma_{j+k+l+m \leq 2} E_{jklm} t^j R_1^{-k} R_2^{-l} L_2^{-m} \quad [8]$$

This fitted slope is the $s_0$ value used in Eq. [7] to constrain the deflection at the transition point for the case of no oil canning.

A single performance measure for dent resistance with the load for a dent of 0.1 mm was chosen. The procedure for determination of the predictive model for dent resistance was previously published by the inventors, but highlights of which are included here for completeness. Five factors were included in the predictive model; material (discrete variable), thickness (t), effective plastic strain ($\bar{\epsilon}$); imparted during stamping, front view radius of curvature R1, and side view radius of curvature R2. Apart from material, all other variables are continuous and incorporated simultaneously into a response surface design. The response surface model is constructed as a sum of orthogonal terms used in the orthogonal polynomials and characterized by an equation of the form:

$$Y = \sum_{klmn} b_{klmn} t^{(k)} \varepsilon^{-(l)} (1/R_1)^{(m)} (1/R_2)^{(n)} \quad (1)$$

where the parameters k, l, m, and n are integers from 0 to 2 with the constraints k≤2, l≤2, m≤2, n≤2, and k+l+m+n≤2. These constraints correspond to including only linear and quadratic dependencies for all the factors. Zero values for k, l, m, or n, or any combination thereof, are allowed; these correspond to cases where the corresponding factor is not included in the term. A constant term is included in the above regression equation by taking k=l=m=n=0. Y in the equation (1) is the load for 0.1 mm dent depth is the dependent variable.

Figure 8A:
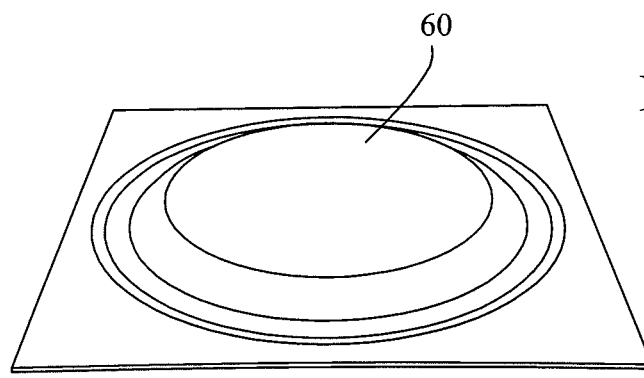
FIG. 8A depicts an experimental panel to evaluate dent resistance.
Figure 8B:
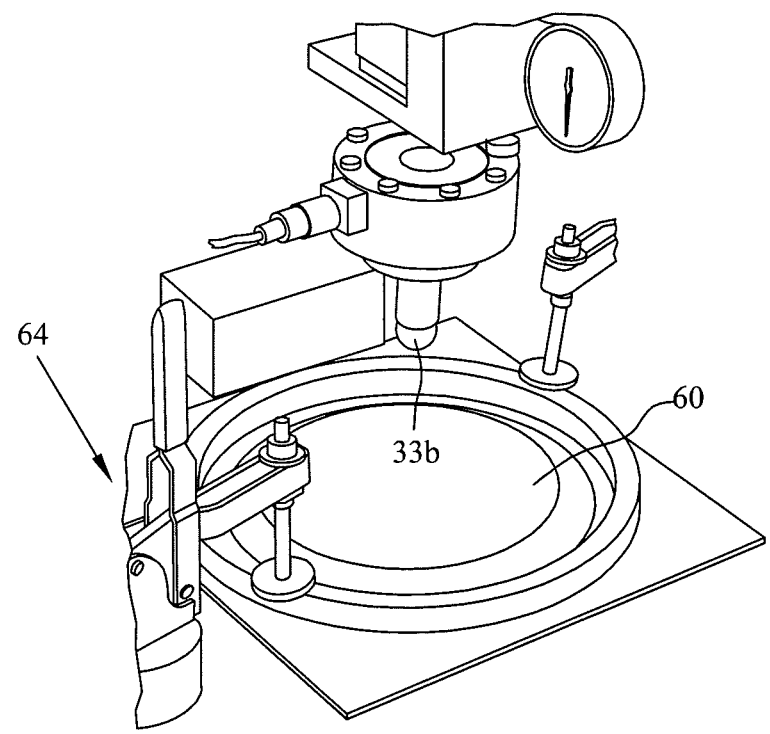
FIG. 8B depicts the testing apparatus and an experimental panel setup to evaluate dent resistance.
Figure 9A:
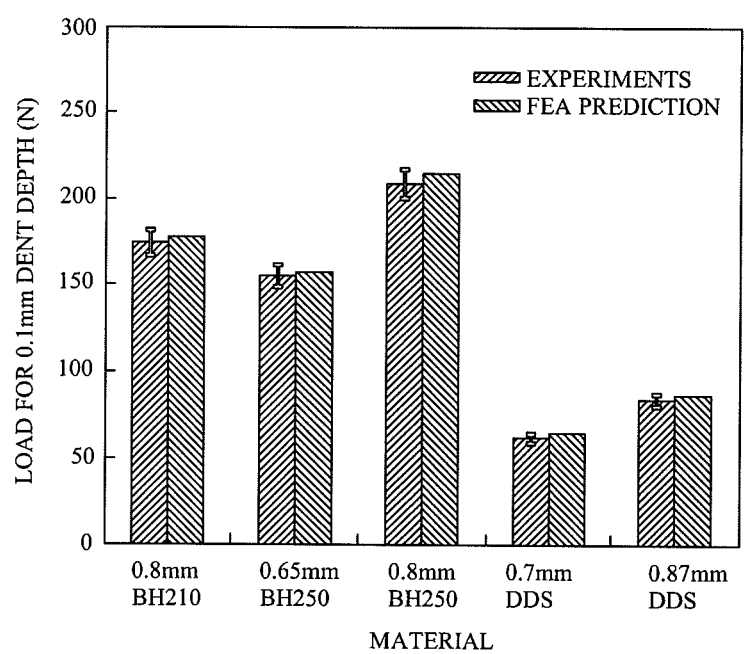
FIG. 9A is a graph depicting physical dent testing results to FEA simulation methodology for a biaxial stretch of 1 percent.
Figure 9B:
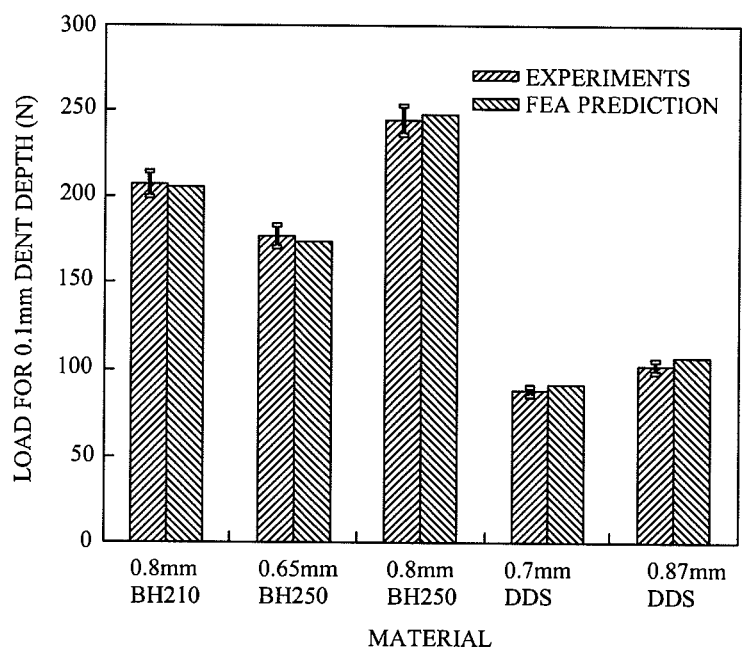
FIG. 9B is a graph depicting physical dent testing results to FEA simulation methodology for a biaxial stretch of 2.5 percent.

FIG. 8A depicts an experimental panel 60 used for dent testing using the Auto/Steel Partnership procedure, where denting is carried out using the hemispherical indenter 33b as shown in FIG. 5B. Experimental panels were formed (as shown in FIG. 8B) using a punch radius of 5,080 mm under fully loaded conditions to generate balanced biaxial pre-strains of 1%×1% and 2.5%×2.5%. The holding feature is shown, generally indicated as 64. FIGS. 9A and 9B show the correlation of the dent testing with FEA for a number of materials for the 1% and 2.5% biaxial stretch levels. As shown in the comparisons, the FEA methodology for dent resistance correlates well.

Figure 10:
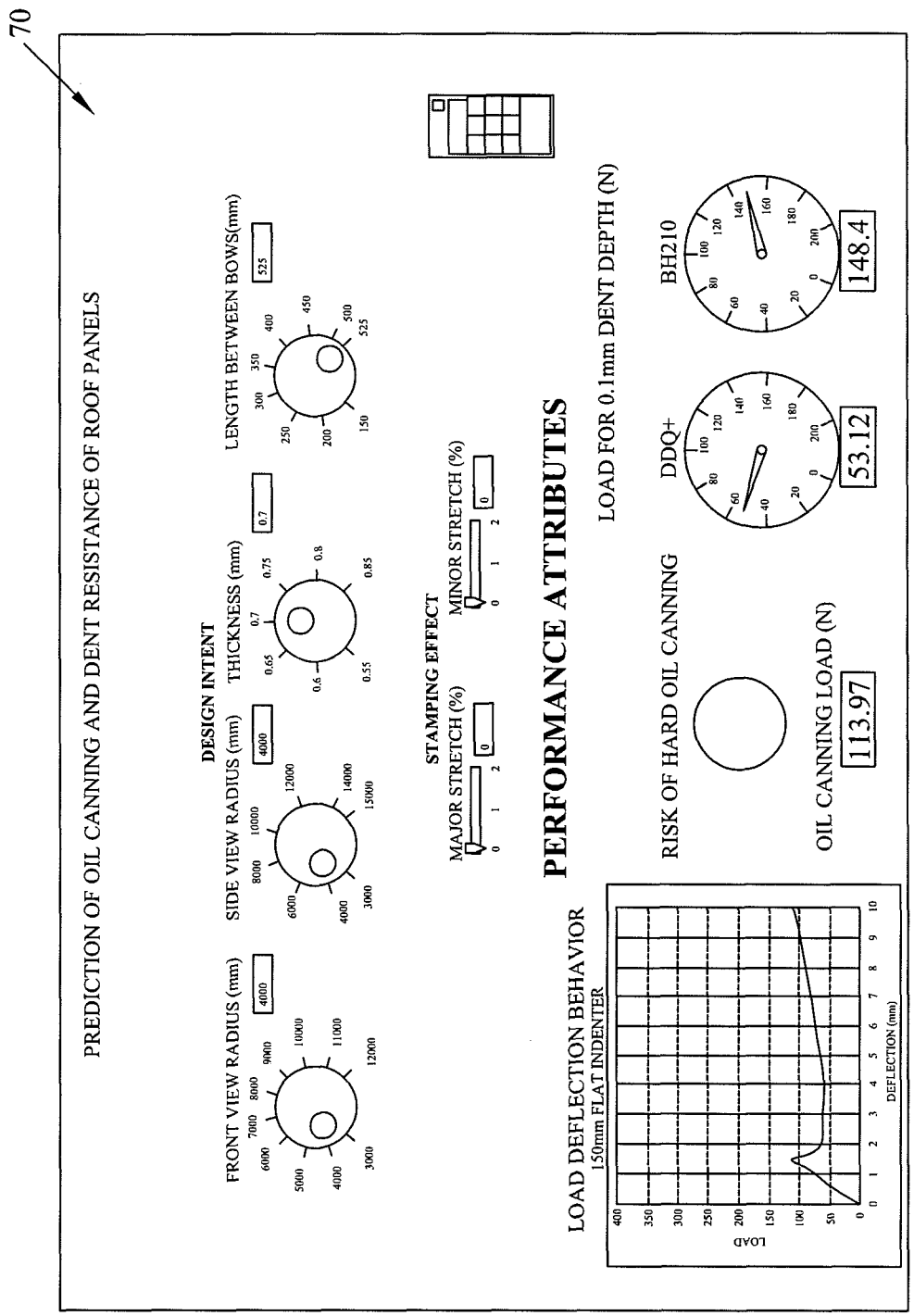
FIG. 10 depicts a unit user interface for combined model for dent resistance and oil canning of roof panels.

Using the FEA procedures described during this report in combination with the mathematical procedure described above to drive the load deflection behavior for snap-through buckling, predictive models for snap-through buckling were created. A predictive model for dent resistance was also created for DDS and BH210 similar to previous work on door panels. Combining the predictive models, a user interface using LabView® was created. LabView® is a product of National Instruments, and offers a variety of GUI tools that can be used for programming. A code then can be compiled to create stand alone executables that can be run independently on any desktop. FIG. 10 is a representation of a developed interface, indicated generally as 70.

The interface includes dynamic controls, such as dials and sliders, with the user being able to input the values of the design intent variables, that is, front view radius R1, side view radius R2, thickness (t) and length between the bows L2. The interface also includes stamping effects through major and minor strain and obtain the load deflection behavior, the oil canning load, and the load for 0.1 mm dent depth. The user can save the results to a local computer and conduct a number of design scenario evaluations in a short time. On the other hand, using the traditional analysis approach, it may take days for determining both oil canning and denting analysis including pre-processing, analysis, and post-processing for one design option. For evaluating a number of options to arrive at an optimized solution that satisfies both requirements, it may take considerably longer. Thus, by utilizing the predictive tool, a user is able to conduct analysis in a much shorter timeframe, thereby increasing productivity and enabling informed decision making early on in the design process when a complete structural model may not be available.

Figure 11A:
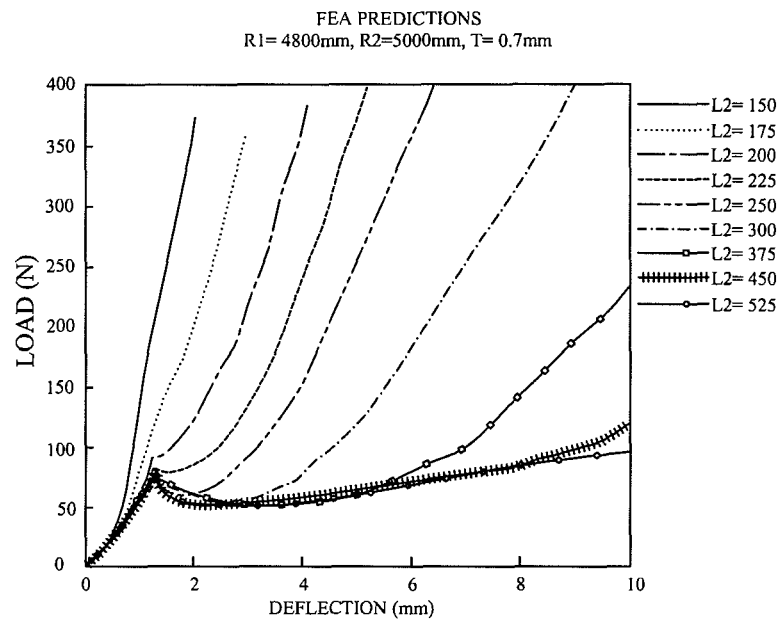
FIG. 11A is a graph showing FEA predictions using a representative area for load versus deflection.
Figure 11B:
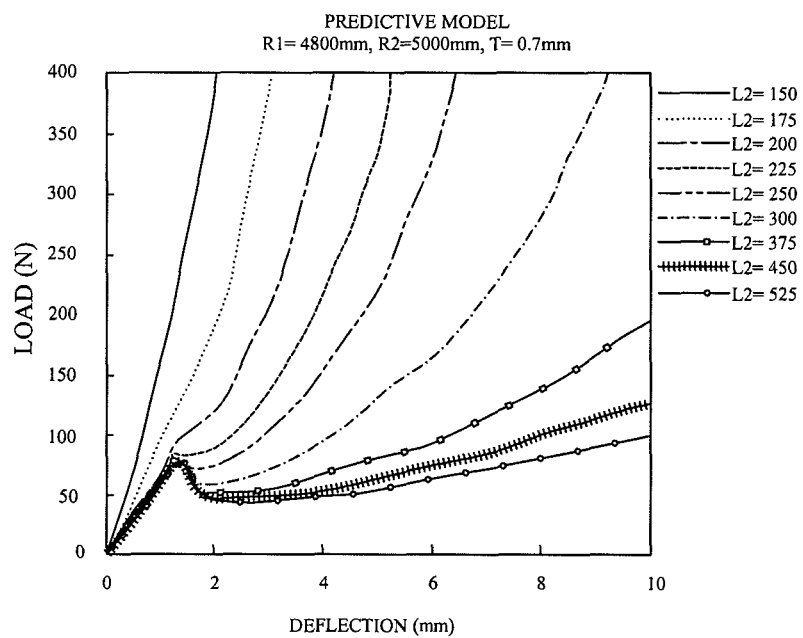
FIG. 11B is a graph showing a predictive model output for a given geometry and different values of unsupported length between bows for applied load virus deflection.

In regard to correlation of the predictive model with FEA, a first step in the correlation is to compare results from the predictive models with FEA results of the RAP models for some specific geometric configurations. FIG. 11A shows the load deflection behavior output using FEA predictions, while FIG. 11B shows the predictive model for one set of values for R1, R2, thickness and different values of the length between bows for L2. Comparison of the graphs in FIGS. 11A and 11B shows that the predictive model compares well to the FEA predictions.

Figure 12:
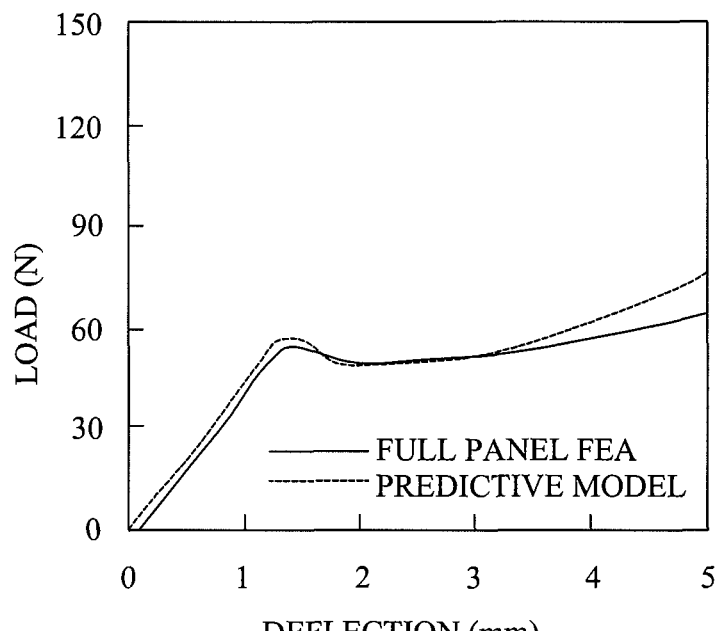
FIG. 12 is a graph showing comparison of load deflection behavior based upon applied load between a full panel FEA and a predictive model.
Figure 13:
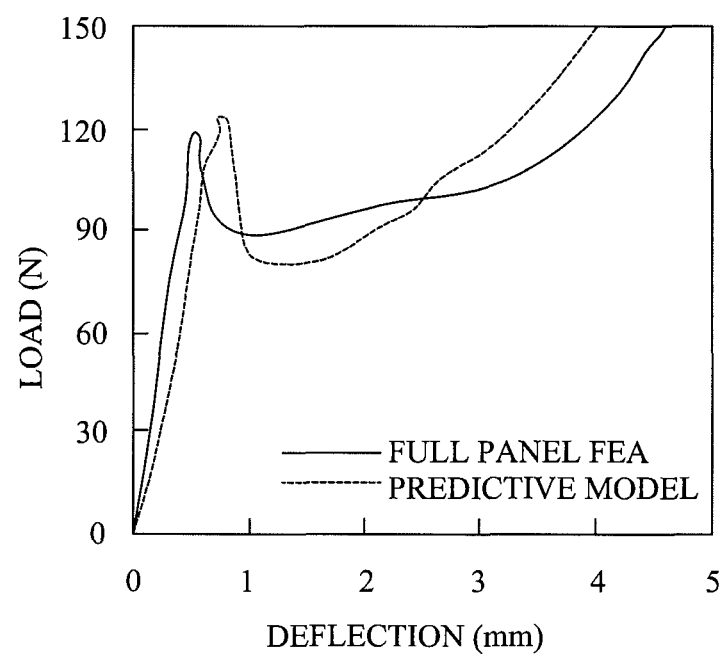
FIG. 13 is a graph showing comparison of the load deflection behavior based upon applied load between an alternate full panel FEA and a predictive model.

Following the first stage of correlations, the next stage was to correlate the predictive model with the full panel FEA of a roof structure. FIGS. 12 and 13 show a comparison of the load deflection behavior based upon applied load for two different panels for both the full panel FEA and predictive model. The correlation is very good and reasonable with FEA predictions when applying the model to idealized conditions, such as areas of constant curvature, which are predominantly true in the center of the roof panel. Predictions are less likely to be successful when areas of significant and sudden change in curvature are present or when the loading location is close to the roof rail or bow.

Accordingly, predictive models for snap-through buckling resistance and dent resistance using a combination of FEA, DOE and mathematical curve fitting have been created. A model for snap-through buckling resistance yields the load deflection curve based upon the front view radius of the curvature R1, the side view radius of curvature R2, the thickness (t), and the unsupported length between the roof beams L2. It was determined that snap-through buckling can be avoided by appropriate placement of roof bows even for roof panel thicknesses as low as 0.55 mm. The results for dent resistance in roof panels were consistent with previous results for door panels. Correlations of the predictive model with a full panel FEA have shown a good correlation.

The developed predictive model can be utilized using an interactive interface to be installed on a website for predicting oil canning and dent resistance on automotive roof panels. The results can be used to provide design guidance to automotive manufacturers in the early stages of development. The tool provides automotive designers the ability to effectively determine "what-if" scenarios and obtain the results on a real-time basis in a matter of moments as opposed to the length of time for dedicated FEA. It is believed significant savings can be realized with the predictive model.

While the invention has been taught with specific reference to these embodiments, one skilled in the art will recognize that changes can be made in form and detail without departing from the spirit and scope of the invention. The described embodiments are to be considered, therefore, in all respects only as illustrative and not restrictive. As such, the scope of the invention is indicated by the following claims rather than by the description.

The invention claimed is:

1. A method of predicting snap-through buckling resistance of a sheet metal panel to an applied load under localized loading conditions, the sheet panel having certain defined geometries, the method comprising the steps of:
   providing a sheet metal panel having a curvature and being supported by structural supports;
   providing a portion of the sheet metal panel as an unsupported span between structural supports;
   identifying a first principal radius of curvature of the sheet metal panel;
   identifying a second principal radius of curvature of the sheet metal panel;
   identifying a thickness of the sheet metal panel;
   identifying a distance of a portion of the sheet metal panel between structural supports;
   creating a mathematical function to determine load deflection behavior for snap-through buckling; and
   determining a likelihood of the span of sheet metal panel in a solid state to display snap-through buckling characteristics under various localized applied loads by inputting the parameters of the first and second principal radii of curvature, the thickness of the sheet metal panel, and the distance of a portion of the sheet metal panel between the structural supports in combination with a mathematical methodology curve resulting from FEA simulation to predict and generate an entire load deflection curve using regression analysis including an initial slope, a point of instability, and the load deflection curve following the point of instability; and
   using the results of the load deflection curve to adjust the distance between the structural supports for elimination of snap-through buckling.

2. The method of predicting snap-through buckling resistance as set forth in claim 1, wherein the first principal radius of curvature is a front view radius of curvature of the sheet metal panel.

3. The method of predicting snap-through buckling resistance as set forth in claim 1, wherein the second principal radius of curvature is a side view radius of curvature of the sheet metal panel.

4. The method of predicting snap-through buckling resistance as set forth in claim 1, wherein the sheet metal panel is a roof panel and the thickness is the thickness of the roof.

5. The method of predicting snap-through buckling resistance as set forth in claim 1, wherein the distance is the length between roof bows supporting the roof panel.

6. The method of predicting snap-through buckling resistance as set forth in claim 1, further including the step of creating an FEA model of localized loading process applied to the sheet metal panel based upon determination of configurations meriting further analysis as determined by the regression analysis.

7. The method of predicting snap-through buckling resistance as set forth in claim 1, further including the step of performing simulated experiments on the sheet metal panel based the input of the plate geometry variables and the FEA model of the localized loading process.

8. The method of predicting snap-through buckling resistance as set forth in claim 1, wherein the method generates a load versus deflection curve depicting hard oil canning including a stable response curve and a collapsed or buckled response curve.

9. The method of predicting snap-through buckling resistance as set forth in claim 1, wherein the method generates a load versus deflection curve depicting soft oil canning including a stable response curve and a collapsed or buckled response curve.

10. The method of predicting snap-through buckling resistance as set forth in claim 1, wherein the method generates a load versus deflection curve showing no oil canning with only a stable response curve.

11. The method of predicting snap-through buckling resistance as set forth in claim 1, wherein the load is applied with a flat indenter.

12. The method of predicting snap-through buckling resistance as set forth in claim 1, including the step of fitting the transition point of the load and deflection by regression, and the load is fitted to a regression containing cubic terms along with quadratic ones in the form of:

$$\ln(y_t) = \Sigma_{j+k+l+m \leq 3, j \leq 2, k \leq 2, l \leq 2} C_{jklm} t^j R_1^{-k} R_2^{-l} L_2^{-m}.$$

13. The method of predicting snap-through buckling resistance as set forth in claim 1, determining the slope of the curve at the origin using a regression equation in the form:

$$s_0 = \Sigma_{j+k+l+m \leq 2} E_{jklm} t^j R_1^{-k} R_2^{-l} L_2^{-m}.$$

14. An apparatus for performing and predicting snap-through buckling resistance of a sheet metal panel to an applied load under localized loading conditions, the sheet panel having certain defined geometries, said apparatus comprising means for approximating the defined geometries of the sheet metal panel including at least one curvature;

means for creating an FEA model of a localized loading process applied to at least one curvature in the sheet metal panel;

means for inputting geometry variables that influence the sheet metal panel to resistance of oil canning, the curvature including at least one curvature value;

means for performing simulated experiments on the sheet metal panel based on the input variables and FEA model of localized loading process; and means for developing a regression model including load deflection behavior and snap-through buckling load from the virtual experiments, wherein the regression model outputs predict and indicate the oil canning resistance of the sheet metal panel under localized loading conditions and generating an entire load deflection curve including an initial slope, a point of instability, and the load deflection curve following the point of instability;

wherein the defined geometries of the sheet metal panel include a front view radius of curvature, a side view radius of curvature, the length between supports being determined by results of the load deflection curve for the sheet metal panel and the thickness of the sheet metal panel.

15. The apparatus as set forth in claim 14, wherein the applied load is provided by a flat indenter.

* * * * *